United States Patent
Tench et al.

(10) Patent No.: US 6,798,556 B2
(45) Date of Patent: Sep. 28, 2004

(54) LOCALLY-SWITCHED REVERSIBLE ELECTRODEPOSITION OPTICAL MODULATOR

(75) Inventors: D. Morgan Tench, Camarillo, CA (US); Ichiro Sugioka, Newbury Park, CA (US)

(73) Assignee: Rockwell Scientific Licensing, LLC., Thousand Oaks, CA (US)

( * ) Notice: Subject to any disclaimer, the term of this patent is extended or adjusted under 35 U.S.C. 154(b) by 0 days.

(21) Appl. No.: 10/355,760

(22) Filed: Jan. 31, 2003

(65) Prior Publication Data

US 2004/0150866 A1 Aug. 5, 2004

(51) Int. Cl.[7] .............................................. G02F 1/153
(52) U.S. Cl. ...................................................... 359/269
(58) Field of Search ................................. 359/265–275

(56) References Cited

U.S. PATENT DOCUMENTS

| | | | |
|---|---|---|---|
| 5,880,872 A | * | 3/1999 | Udaka ........................ 359/273 |
| 5,903,382 A | | 5/1999 | Tench |
| 5,923,456 A | | 7/1999 | Tench |
| 6,111,685 A | | 8/2000 | Tench |
| 6,166,847 A | | 12/2000 | Tench |
| 6,256,135 B1 | | 7/2001 | Tench |
| 6,301,039 B1 | | 10/2001 | Tench |
| 6,400,491 B1 | | 6/2002 | Tench |
| 6,471,360 B2 | * | 10/2002 | Rukavina et al. ........... 359/609 |
| 6,621,616 B1 | * | 9/2003 | Bauer et al. ................ 359/273 |

OTHER PUBLICATIONS

J. Mantell and S. Zaromb, J. Electrochem. Soc. 109, 992 (1962).

J. P. Ziegler and B.M. Howard, Solar Eng. Mater. Solar Cells 39, 317, (1995).

* cited by examiner

Primary Examiner—Scott J. Sugarman
Assistant Examiner—Darryl J. Collins

(57) ABSTRACT

The present invention is a reversible electrodeposition optical modulation device employing a segmented counter electrode that permits localized areas of a continuous optical modulation electrode to be switched independently of each other. Such devices can be configured to enable practically seamless switching over the entire device for smart window and adjustable mirror applications, or to minimize cross-talk and pixel overlap for display applications. Since the electrical contacts and switching circuitry are located on the counter electrode, more active area is available for optical modulation.

19 Claims, 3 Drawing Sheets

LOCALLY-SWITCHED REVERSIBLE ELECTRODEPOSITION OPTICAL MODULATOR

BACKGROUND OF THE INVENTION

1. Field of the Invention

This invention is concerned with devices, such as adjustable mirrors, smart windows, optical attenuators and displays, for controlling the reflectance and/or transmission of electromagnetic radiation.

2. Description of the Related Art

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. Such approaches are only partially effective since the window itself is heated so that heat is transferred into the interior by convection. In addition, these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable, low-voltage smart window with variable reflectivity. Reflecting the light, rather than absorbing it, is the most efficient means for avoiding inside heating. Devices for effectively controlling transmission of light are also needed for a variety of other applications. For example, an effective means for controlling light transmission over a wide dynamic range is needed to permit use of inexpensive arc lamps as light sources for projection displays.

Bright light from headlamps on following vehicles reflected in automobile rear and side view mirrors is annoying to drivers and creates a safety hazard by impairing driver vision. Currently available automatically dimming mirrors rely on electrochromic reactions to produce electrolyte species that absorb light that would otherwise be reflected from a static mirror. Such devices do not provide close control over the amount of reflected light, and are expensive to fabricate since a very constant inter-electrode spacing (i.e., cell gap) is required to provide uniform dimming. Image sharpness is also reduced for electrochromic mirror devices since the reflected light must pass through the electrolyte (twice). There is an important need for an inexpensive adjustable mirror device that provides close control of reflected light with minimal image distortion.

Some earlier workers attempted to exploit reversible electrodeposition of a metal for light modulation, primarily for display applications [see for example, J. Mantell and S. Zaromb, J. Electrochem. Soc. 109, 992 (1962) and J. P. Ziegler and B. M. Howard., Solar Eng. Mater. Solar Cells 39, 317, (1995)]. In these cases, metal, typically silver or bismuth, was reversibly electrodeposited onto a transparent working electrode, usually indium tin oxide (ITO), from a thin layer of electrolyte sandwiched between the working electrode and a counter electrode. Both water and organic liquids (e.g., dimethylsulfoxide or dimethylformamide) were employed as solvents. The deposits obtained on the transparent electrode presented a rough and black, gray, or sometimes colored appearance (typical of finely-divided metals) and were used to enhance light absorption by display elements. Pigments were often added to the electrolyte to provide a white background for improved contrast. An auxiliary counter electrode reaction (e.g., halide ion oxidation) was typically employed so as to provide a voltage threshold (which is needed for matrix addressing) and/or to avoid metal deposition on a transmissive counter electrode (which would offset the light modulation provided by metal deposition on the working electrode). Such auxiliary reactions introduced chemistry-related instabilities during long term operation and led to deposit self erasure on open circuit via chemical dissolution of the metal deposit. Nonetheless, the key drawback of reversible metal electrodeposition for display applications was the relatively slow response for attaining adequate light blocking.

A reversible electrochemical mirror (REM) device permitting efficient and precise control over the reflection/transmission of visible light and other electromagnetic radiation is described in U.S. Pat. Nos. 5,903,382, 5,923,456, 6,111,685 and 6,166,847, to Tench, et al. In this device, an electrolyte containing ions of an electrodepositable metal is sandwiched between a mirror electrode and a counter electrode, at least one of which is substantially transparent to the radiation. A typical transparent mirror electrode is indium tin oxide (ITO) or fluorine doped tin oxide (FTO) deposited on a transparent glass (or plastic) pane which serves as the substrate. Application of a voltage causes the electrodepositable metal, e.g., silver, to be deposited as a mirror on the mirror electrode while an equal amount of the same metal is dissolved from the counter electrode. When the voltage polarity is switched, the overall process is reversed so that the electrodeposited mirror metal is at least partially dissolved from the mirror electrode. A thin surface modification layer of a noble metal, e.g., 15–30 Å of platinum, on the transparent conductor is usually required to improve nucleation so that a mirror deposit is obtained. The thickness of mirror metal layer present on the mirror electrode determines the reflectance of the device for radiation, which can be varied over a wide range.

The REM technology can be used to provide control of either light reflectance or transmission, or both. A transmissive REM device suitable for smart window applications utilizes a counter electrode that is locally distributed, as a grid for example, on a transparent substrate, e.g., glass or plastic, so that mirror metal deposited thereon does not appreciably increase light blockage. In this case, high light transmission is provided by a locally distributed counter electrode of relatively small cross-sectional area and the device reflectance/transmission is adjusted via the thickness of mirror metal on the mirror electrode. As described in U.S. Pat. No. 6,166,847, such a transmissive counter electrode is not required for reflective REM devices used for adjustable mirror applications.

An electrolytic solution providing the inherent stability, high deposit quality, complete deposit erasure, long cycle life, and reasonably fast switching needed for most practical REM applications is described in U.S. Pat. No. 6,400,491, to Tench, et al. This solution is typically comprised of 1.5 M AgI and 2.0 M LiBr in a gamma-butyrolactone (GBL) solvent, and may also contain highly dispersed silica (HDS) added to produce a gelled electrolyte and/or dispersed carbon added to blacken the electrolyte so as to reduce background light reflection. Ionic liquid electrolytes may be used to provide faster switching and/or more uniform mirror formation and erasure in REM devices.

Under some circumstances, it would be highly advantageous to switch specific areas of optical modulation devices independent of other areas. For example, such localized switching of automotive mirrors could permit glare from headlights on following vehicles to be reduced without significantly affecting the image brightness in other areas of the mirror, which would provide a significant safety benefit. Likewise, localized switching of smart windows could provide improved visibility and/or increased interior lighting while retaining much of the energy benefit of such devices. In principle, localized switching of reversible electrodeposition devices could be provided by dividing the working electrode, which provides the optical modulation, into individually addressable segments. This is analogous to the approach generally used to switch display elements in a display device. However, the appreciable separation between segments required for electrical isolation and to accommodate the individual electrical connections is unacceptable for most optical modulation applications. Consequently, there is a significant need for a capability of providing localized switching of a substantially continuous optical modulation electrode. This capability might also be used to increase the performance and active area of display devices.

SUMMARY OF THE INVENTION

Reversible electrodeposition optical modulation devices are comprised of an optical modulation electrode, which is substantially transparent to the radiation to be modulated, a counter electrode, and an electrolyte containing electrodepositable metal ions disposed between and in contact with the two electrodes. Typically, both electrodes are planar and parallel and a seal is provided around the perimeter of the electrodes to contain the electrolyte and prevent intrusion of contaminants from the atmosphere. A negative applied voltage tends to cause metal deposition onto the optical modulation electrode and metal dissolution (or another electrochemical reaction) at the counter electrode, whereas a positive applied voltage tends to reverse these processes. Metal may be deposited on the optical modulation electrode as a mirror deposit that increases reflectance and decreases transmission of the radiation, or as a matte or rough deposit that decreases transmission and may increase light absorption. A typical device would employ an indium tin oxide (ITO) coating on a glass pane as the optical modulation electrode and a sheet or coating of the electrodepositable metal as the counter electrode. For a conventional display device, the optical modulation electrode is divided into segments (e.g., pixels or alpha-numeric elements) that are separately addressable via individual electrical contacts.

The present invention is a reversible electrodeposition optical modulation device employing a segmented counter electrode that enables individual areas of a continuous optical modulation electrode to be switched independently of each other. A voltage applied to a given counter electrode segment causes metal to be deposited or dissolved (depending on the voltage polarity) predominantly within the area of the optical modulation electrode directly opposed and defined by that counter electrode segment. Deposition or dissolution outside the defined area can be suppressed (to avoid overlap or cross-talk between display elements, for example) by utilizing a small electrode spacing and an electrolyte having relatively high electrical resistivity. The discontinuity between deposits on the optical modulation electrode resulting from the gap between counter electrode segments can be minimized (for an adjustable mirror or smart window device, for example) by utilizing a small spacing between counter electrode segments in conjunction with a relatively large cell gap and/or an electrolyte with relatively low resistivity.

One embodiment of the present invention is a reversible electrochemical mirror (REM) device employing an electrolyte (containing electrodepositable metal ions) in contact with a transparent mirror-forming electrode and a segmented counter electrode. The mirror electrode, which is the optical modulation electrode, is typically comprised of a thin surface modification layer of noble metal (e.g., platinum) on a layer of a transparent conducting oxide (e.g., indium tin oxide) on a glass or plastic substrate. The noble metal layer enhances nucleation so that mirror electrodeposits are obtained. The counter electrode in REM devices according to the present invention is a segmented sheet or layer of the electrodepositable mirror metal for devices that are designed to control radiation reflection, and is a segmented locally distributed electrode for devices that also transmit radiation. The reflectance of a selected area of the device is determined by the thickness of the mirror metal layer on the selected area of the mirror electrode, which can be adjusted by applying a voltage of the appropriate polarity between the mirror electrode and the segment of the counter electrode opposite to the selected mirror electrode area. The applied voltage causes mirror metal electrodeposition or dissolution predominantly within the selected area of the mirror electrode, while the reverse process occurs at the selected counter electrode segment. In this case, the discontinuity between deposits on the optical modulation electrode produced by adjacent counter electrode segments is minimized by utilizing a small spacing between counter electrode segments in conjunction with a relatively large cell gap and/or an electrolyte with relatively low resistivity. Applications for REM devices with segmented counter electrodes include automotive rear and side view mirrors with adjustable reflectivity and smart windows for use in transportation vehicles and buildings. Mirror deposits on the optical modulation electrode, typically obtained via use of a noble metal surface modification layer, are usually advantageous but the invention could also be applied to optical modulation devices that do not employ a surface modification layer.

Another embodiment of the present invention is a reversible electrodeposition display device employing a counter electrode having electrically isolated segments that are used to produce reversible metal electrodeposition in well defined areas, which serve as the display elements (e.g., pixels or alpha-numeric segments), on a continuous transparent display electrode. Cross-talk or overlap between adjacent display elements may be minimized by utilizing a small interelectrode spacing and an electrolyte having relatively high resistivity, for example, an ionic liquid electrolyte. Poorly-reflecting electrodeposits may be used on display elements to block or absorb light, or a noble metal surface modification layer may be used to provide mirror deposits that reflect light. Reflective elements may be viewed directly or used for projection displays.

This invention enables metal deposition within selected areas of an optical modulation electrode in a reversible electrodeposition device, as well as relatively uniform deposition over the entire active electrode area with minimal discontinuity between the individually addressable areas. Localized switching of REM automotive mirrors permits glare from headlights on following vehicles to be reduced without significantly affecting the image brightness in other areas of the mirror. The enhanced mirror visibility is beneficial to driving safety. Localized switching of smart windows according to this invention may be used to provide improved visibility and/or increased interior lighting with minimal sacrifice in energy efficiency. For display devices, the invention permits switching circuitry and electrical contacts for the display elements to be placed on the counter electrode so that more pixel area is available on the optical modulation electrode.

Further features and advantages of the invention will be apparent to those skilled in the art from the following detailed description, taken together with the accompanying drawings.

These figures are not to scale and some features have been enlarged for better depiction.

DETAILED DESCRIPTION OF THE INVENTION

Figure 1:
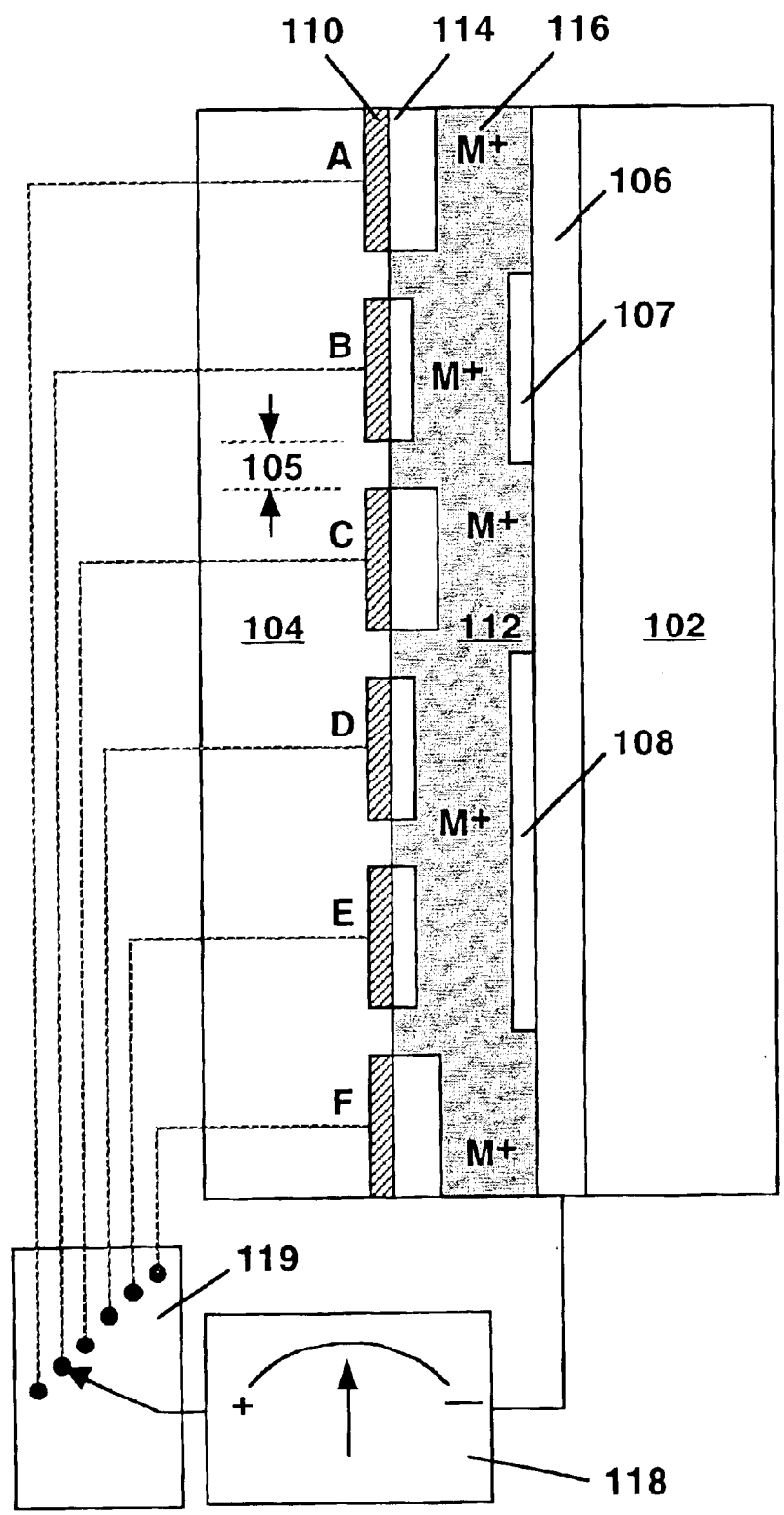
FIG. 1 is a cross-sectional view of a reversible electrodeposition optical modulation device employing a segmented counter electrode according to the present invention.

FIG. 1 is a cross-sectional view of a reversible electrodeposition optical modulation device employing a segmented counter electrode according to the present invention. In this example, optical modulation electrode 106 is uniformly disposed on substrate 102, and counter electrode 110 is comprised of segments A through F disposed on insulating substrate 104 and separated by a gap of width 105. The segments A through F of counter electrode 110 may be recessed relative to the surface of substrate 104, as depicted in FIG. 1, or may be disposed upon the surface of substrate 104. Electrolyte 112 containing electrodepositable metal ions 116 is disposed between and in contact with optical modulation electrode 106 and counter electrode 110, as well as portions of substrate 104. Each counter electrode segment 110-A through 110-F is electrically connected to electrical switch 119 such that voltage from electrical power source 118 can be applied between optical modulation electrode 106 and one or more segments A through F of counter electrode 110. The device may be initially charged with electrodepositable metal by depositing the metal on electrode 110 or on electrode 106, or by depositing partial metal layers on each of the two electrodes.

Optical modulation electrode 106 is preferably comprised of a transparent conductor film and may include an optional surface modification layer (not shown) to provide a mirror electrodeposit. The transparent conducting film is typically indium tin oxide (ITO) or fluorine-doped tin oxide(FTO) but may also be comprised of another material, for example, aluminum-doped zinc oxide, antimony-doped tin oxide, indium oxide, fluorine-doped indium oxide, aluminum-doped tin oxide, phosphorus-doped tin oxide, or indium zinc oxide. The surface modification layer, if employed, is typically a noble metal selected from the group consisting of platinum, iridium, gold, osmium, palladium, rhenium, rhodium and ruthenium. An underlayer of another metal (e.g., aluminum, chromium, hafnium, molybdenum, nickel, titanium, tungsten or zirconium) may be used to improve the adhesion of the surface modification layer. Substrate 102 is typically comprised of a transparent glass or plastic material.

Electrolyte 112 may be any suitable aqueous, nonaqueous, solid or ionic liquid electrolyte containing ions 116 of an electrodepositable metal, preferably selected from the group consisting of silver, bismuth, copper, tin, cadmium, mercury, indium, lead, antimony, thallium, zinc, and alloys thereof.

As further depicted in FIG. 1, a positive voltage applied to counter electrode segment 110-B tends to dissolve electrodeposited metal from layer 114-B on segment 110-B into electrolyte 112 and to electrodeposit a metal layer 107 predominantly in the area of optical modulation electrode 106 directly opposite counter electrode segment 110-B. Deposition of electrodepositable metal in areas of optical modulation electrode 106 substantially distant from counter electrode segment 110-B is suppressed because the voltage is reduced by the greater electrical resistance associated with the longer electrolyte electrical paths. However, the geometric area of the metal layer deposited on the optical modulation electrode is generally larger than the counter electrode segment producing the deposit, as depicted for deposited metal layer 107 and counter electrode segment 110-B in FIG. 1. Under some conditions, metal deposited by application of a positive voltage to adjacent counter electrode segments forms a continuous and substantially uniform metal layer on the optical modulation electrode, as indicated for segments 110-D and 110-E and metal deposit 108 in FIG. 1. Applying a negative voltage to a given counter electrode segment tends to cause metal deposited on the optical modulation electrode in the localized area opposite to that counter electrode segment to dissolve into the electrolyte. The propagation of light for a particular localized area of optical modulation electrode 106 is determined by the thickness of the electrodeposited metal layer in that area, which can be adjusted by applying a voltage of the appropriate polarity between the optical modulation electrode and the corresponding segment of the counter electrode. The present invention may also be used for devices utilizing a counter electrode reaction other than reversible metal electrodeposition.

Localization of metal deposition and dissolution within areas on the optical modulation electrode opposing the counter electrode segments, which is typically desirable for a display device, can be enhanced by utilizing a small spacing between the electrodes and/or an electrolyte having a relatively high resistivity. On the other hand, the discontinuity between deposits on the optical modulation electrode for an adjustable mirror or smart window device can be minimized by utilizing a small gap width 105 between counter electrode segments in conjunction with a relatively large electrode spacing and/or an electrolyte with relatively low resistivity. With modern lithographic methods, segmented electrodes can readily be fabricated with gap widths of less than 10 microns, for which discontinuities between deposits of equivalent thickness on the optical modulation electrode would generally be negligible.

Figure 2:
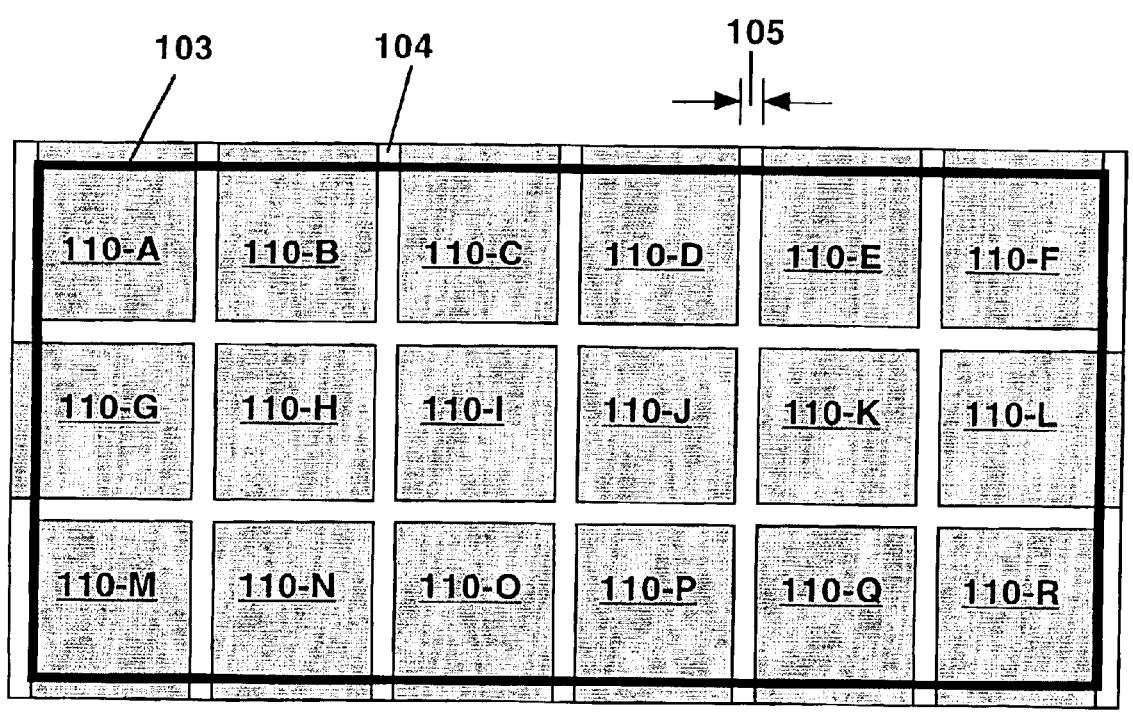
FIG. 2 depicts a segmented counter electrode suitable for use in a reversible electrodeposition optical modulation device according to the present invention.

FIG. 2 depicts a segmented counter electrode 110 of a type suitable for use with the device of the present invention. Electrode 110 is comprised of electrode segments 110-A through 110-R disposed on substrate 104, which is comprised of an electrically insulating material. The width 105 of the gap between electrode segments typically has a substantially constant value, as depicted in FIG. 1, but may also be varied, for example, to provide a particular pattern of deposited metal on the optical modulation electrode. Likewise, the counter electrode segments may be of any shape suitable for providing a desired pattern of deposited metal on the optical modulation electrode. Substrate 104 is preferably stable in the electrolyte used in the device but may also be a relatively unstable material coated with a more stable material. A wide variety of materials can be used for substrate 104, including plastic, resin, glass, ceramic and composite materials, which might also include metals.

Electrode 110 may in principle be comprised of almost any electrically conducting material since it is typically covered by a layer of electrodepositable metal under normal device operating conditions and is not exposed to the electrolyte. Electrode 110 may also be composed entirely of electrodepositable metal in a layer of sufficient thickness that it is not consumed during device operation. However, electrode 110 is preferably stable in contact with the electrolyte over the voltage range used for device switching so as to preclude the possibility of counter electrode dissolution or loss, as well as associated contamination of the electrolyte. With such a stable counter electrode material, the amount of electrodepositable metal can be minimized and the electrodepositable metal can be fully dissolved from electrode 110 to initialize the state of the electrodes in the device. Such initialization may be advantageous, for example, to periodically re-establish a uniform distribution of metal along the electrode surfaces.

High stability for electrode 110 may be provided by use of noble metals, which include platinum, iridium, gold, osmium, palladium, rhenium, rhodium and ruthenium. In this case, a thin noble metal layer on a less expensive electrode material is preferred to minimize noble metal costs and to facilitate fabrication of the segmented counter electrode. The noble metal is preferably applied to substrate 104 or to a less expensive electrode material by a vacuum deposition method (sputtering or evaporation, for example) but could be applied by another method (electroplating or electroless plating, for example) or a combination of methods. Almost any electrical conductor protected with a sufficiently thick noble metal coating could be employed to fabricate the segmented counter electrode of the present invention. A preferred counter electrode is comprised of a thin layer (15 Å–30 Å) of sputtered platinum on an indium tin oxide (ITO) or fluorine doped tin oxide (FTO) layer on a glass or plastic substrate. Other conducting oxides may also be used, including aluminum-doped zinc oxide, antimony-doped tin oxide, indium oxide, fluorine-doped indium oxide, aluminum-doped tin oxide, phosphorus-doped tin oxide, or indium zinc oxide. Less noble metals (chromium, nickel, titanium, hafnium, molybdenum, zirconium and stainless steel., for example) might be sufficiently stable for use as counter electrode materials in some electrolyte system. A noble metal overlayer may also be used to improve the stability of such metals.

Segmented electrodes according to the present invention are readily fabricated by standard lithographic methods. For example, the gap areas between electrode segments may be masked by a stencil or photoresist, which is removed or lifted off to expose areas of insulating substrate 104 after the electrode layers are deposited. Alternatively, segments of a continuous electrode layer or layers may be protected by photoresist or a stencil while material in the gap areas between electrode segments is removed by chemical etching, ion milling, mechanical milling, mechanical abrasion, or other means. For some counter electrode structures and fabrication procedures, it may be necessary to apply a protective layer of inert material to prevent reaction of less stable material exposed at the electrode segment edges.

Segmented electrodes according to the present invention may also be fabricated from solid electrode segments adhesively attached to an insulating substrate or molded/ embedded into the surface of a plastic or resin substrate. In this case, stable materials that are difficult to vapor deposit, stainless steel, for example, can be used for electrode 110 and exposure of reactive edges is avoided.

Electrical contact to individual counter electrode segments located at the edge of the device is readily established by having the electrode material extend through seal 103 to the outside of the cell, as depicted in FIG. 2. Electrical contact to isolated electrode segments contained within the cell area (segments 110-H through 110-K in FIG. 2) may be made via wires or circuit traces that pass through substrate 104 (as indicated in FIG. 1) or are insulated from the electrolyte and routed along the gaps between electrode segments and through seal 103 to the outside of the cell. Various other arrangements for establishing electrical contact to individual segments of counter electrode 110 will be apparent to those skilled in the art.

Fabrication of a Preferred Embodiment

Figure 3:
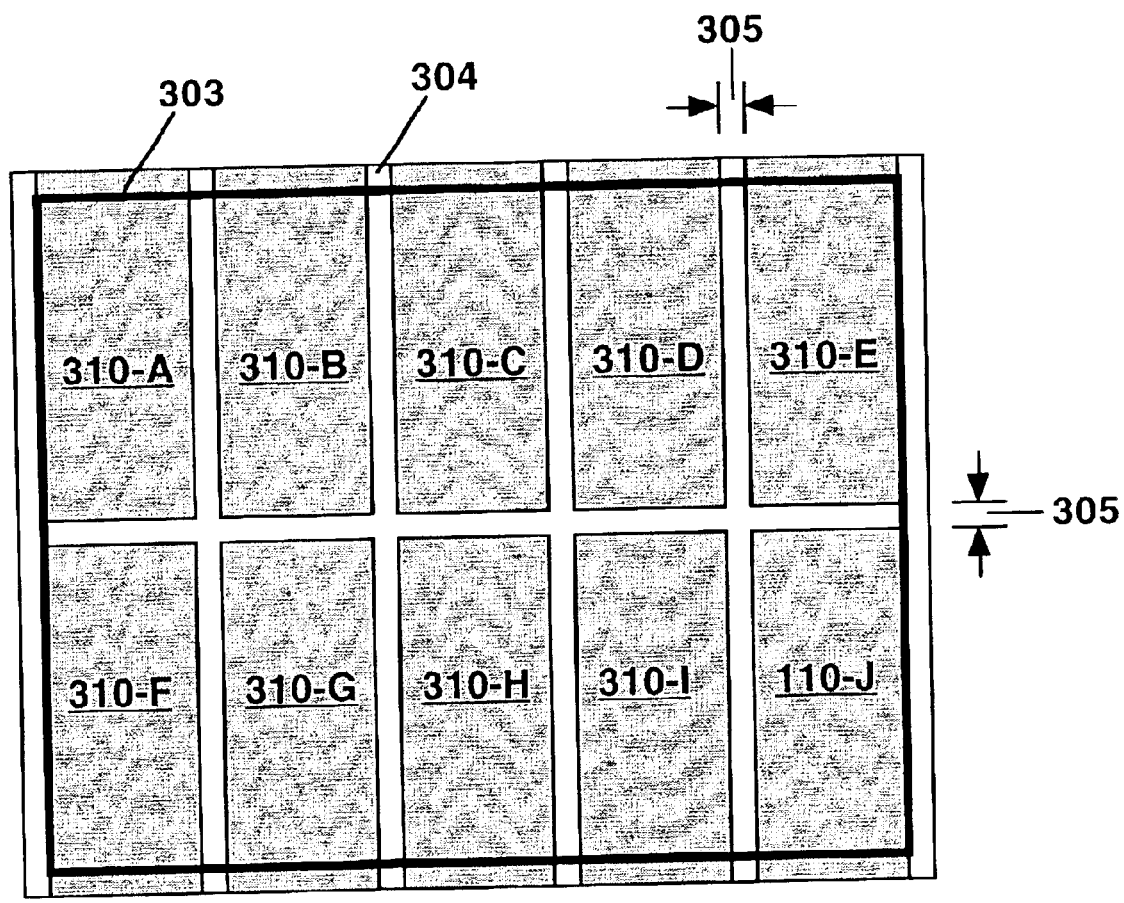
FIG. 3 depicts a segmented counter electrode employed in a reversible electrochemical mirror device fabricated and tested according to the present invention.

A reversible electrochemical mirror (REM) device having a segmented counter electrode according to the present invention was fabricated and successfully tested. Both electrodes for this test device were comprised of a 15 Å sputtered platinum surface modification layer on 10 ohm-square indium tin oxide (ITO) transparent conductor on a clear glass pane substrate (1 mm thick). FIG. 3 depicts the configuration of the segmented counter electrode 310, which consisted of ten rectangular segments 310-A through 310-J having an active area (inside seal 303) of approximately 1.8×4.0 cm each. Gap width 305 between counter electrode 110 segments was less about 1 mm.

The segmented electrode was fabricated by protecting the areas corresponding to the electrode segments on a Pt/ITO/ glass pane (10.6×10.6 cm) with plater's tape and etching away the exposed Pt/ITO layers in an acid solution (consisting of 1 part concentrated hydrochloric acid, 0.01 part concentrated nitric acid and 1 part water by volume) leaving only the glass substrate 304 in the gap between electrode segments. The plater's tape on the electrode segments was then removed and strips of plater's tape were placed in the segment gap areas to ensure that electrical isolation was maintained. The segments on the electrode were bussed together and electroplated at 5 mA/cm$^2$ with about 1 $\mu$m of silver from a commercial cyanide bath (Technisilver 2E, Technic Co.) with mild agitation. After removal of the plater's tape, the electrode was annealed at 200° C. for 30 minutes in an inert atmosphere (to improve adhesion of the silver to the Pt/ITO substrate).

A REM cell with an electrode spacing of approximately 1 mm and an active area of 8.1×9.1 cm was fabricated by applying 1-mm thick acrylic adhesive tape (VHB #4910, 3M Company) to form seal 303 between segmented counter electrode 310 and the Pt/ITO/glass optical modulation electrode (9.7×10.6 cm). Electrolyte preparation and final device assembly were performed inside a nitrogen atmosphere glove box to avoid contamination with oxygen, which reacts electrochemically and can cause mirror self-erasure via chemical dissolution of the mirror metal. The electrolyte was injected through the acrylic tape seal using a pair of hypodermic needles (inlet and outlet) and a syringe. Electrical contact to the individual counter electrode segments and the optical modulation electrode were made by attaching copper wires with silver epoxy to the areas of the Pt/ITO layers that extended outside the cell. Non-conducting epoxy was used to provide a second seal and to help hold the electrical contacts in place. The electrolyte contained 1.5 M AgI+2.0 M LiBr+63 mg/mL highly dispersed silica (M-5 Cab-O-Sil, Cabot Co.)+1.5 mg/mL carbon black (Vulcan, Cabot Co.) in high-purity GBL solvent (<20 ppm water).

When a positive voltage of 0.5 V was applied between a selected counter electrode segment and the optical modulation electrode, silver was electrodeposited (as a mirror) only in the area of the optical modulation electrode opposite to the selected counter electrode segment. This electrodeposit was dissolved when the polarity of the applied voltage was reversed. When all of the counter electrode segments were connected together and a positive voltage of 0.5 V was applied between the counter electrode and the optical modulation electrode, silver was electrodeposited (as a mirror) in a substantially uniform layer over the entire surface of the optical modulation electrode, the mirror on the optical modulation electrode appearing to be only slightly less reflective in the vicinity of the gaps between the counter electrode segments. Such discontinuities in the mirror deposit could undoubtedly be practically eliminated by use of a smaller gap between the counter electrode segments. When the entire optical modulation electrode was covered with electrodeposited silver and a negative voltage of 0.5 V was applied between a selected counter electrode segment and the optical modulation electrode, silver was dissolved only in the area of the optical modulation electrode opposite to the selected counter electrode segment.

The preferred embodiments of the present invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. A reversible electrodeposition device for controlling the propagation of electromagnetic radiation, comprising:

an optical modulation electrode which is substantially transparent to the radiation;

a counter electrode comprised of a plurality of electrically isolated segments; and an electrolyte containing ions of an electrodepositable metal, in electrical contact with said optical modulation electrode and said counter electrode, such that a positive electrical potential applied to one of said segments relative to said optical modulation electrode tends to cause the electrodepositable metal to be electrodeposited from said electrolyte onto a localized area of said optical modulation electrode, and such that a negative electrical potential applied to one of said segments relative to said optical modulation electrode tends to cause the electrodepositable metal to be dissolved into said electrolyte from a localized area of said optical modulation electrode, wherein the amount of electrodeposited metal subsisting on said optical modulation electrode affects the propagation of electromagnetic radiation by the device.

2. The device of claim 1, wherein said optical modulation electrode comprises a film of a transparent conducting material on a transparent substrate.

3. The device of claim 2, wherein the transparent conducting material is selected from the group consisting of indium tin oxide, fluorine-doped tin oxide, aluminum-doped zinc oxide, antimony-doped tin oxide, indium oxide, fluorine-doped indium oxide, aluminum-doped tin oxide, phosphorus-doped tin oxide, and indium zinc oxide.

4. The device of claim 2, wherein the transparent substrate is comprised of glass or plastic.

5. The device of claim 2, wherein said optical modulation electrode further comprises a thin surface modification layer.

6. The device of claim 5, wherein the surface modification layer is comprised of a noble metal selected from the group consisting of platinum, iridium, gold, osmium, palladium, rhenium, rhodium and ruthenium.

7. The device of claim 1, wherein said counter electrode is comprised of a first counter electrode metal.

8. The device of claim 7, wherein the first counter electrode metal is the same as the electrodepositable metal.

9. The device of claim 7, wherein the first counter electrode metal is selected from the group consisting of chromium, nickel, titanium, hafnium, molybdenum, zirconium and stainless steel.

10. The device of claim 7, wherein the first counter electrode metal is a noble metal selected from the group consisting of platinum, iridium, gold, osmium, palladium, rhenium, rhodium and ruthenium.

11. The device of claim 7, wherein said counter electrode further comprises an overlayer of a second counter electrode metal disposed on the first counter electrode metal.

12. The device of claim 11, wherein the second counter electrode metal is a noble metal selected from the group consisting of platinum, iridium, gold, osmium, palladium, rhenium, rhodium and ruthenium.

13. The device of claim 1, wherein said counter electrode is comprised of an oxide conductor selected from the group consisting of indium tin oxide, fluorine-doped tin oxide, aluminum-doped zinc oxide, antimony-doped tin oxide, indium oxide, fluorine-doped indium oxide, aluminum-doped tin oxide, phosphorus-doped tin oxide, and indium zinc oxide.

14. The device of claim 13, wherein said counter electrode further comprises an overlayer, disposed on the oxide conductor, of a noble metal selected from the group consisting of platinum, iridium, gold, osmium, palladium, rhenium, rhodium and ruthenium.

15. The device of claim 1, wherein said counter electrode is disposed on an electrically insulating substrate comprised of a material selected from the group consisting of glasses, ceramics, plastics, resins, and composites.

16. The device of claim 1, wherein said electrolyte is selected from the group consisting of aqueous, nonaqueous, solid and ionic liquid electrolytes.

17. The device of claim 1, wherein the electrodepositable metal is selected from the group consisting of silver, copper, tin, zinc, palladium, bismuth, cadmium, mercury, indium, lead, antimony, thallium, and alloys thereof.

18. A reversible electrodeposition device for controlling the propagation of electromagnetic radiation, comprising:

an optical modulation electrode which is substantially transparent to the radiation;

a counter electrode comprised of a plurality of electrically isolated segments of a metal disposed on an electrically insulating substrate comprised of a material selected from the group consisting of glasses, ceramics, plastics, resins, and composites; and an electrolyte containing ions of an electrodepositable metal, in electrical contact with said optical modulation electrode and said counter electrode, such that a positive electrical potential applied to one of said segments relative to said optical modulation electrode tends to cause the electrodepositable metal to be electrodeposited from said electrolyte onto a localized area of said optical modulation electrode, and such that a negative electrical potential applied to one of said segments relative to said optical modulation electrode tends to cause the electrodepositable metal to be dissolved into said electrolyte from a localized area of said optical modulation electrode, wherein the amount of electrodeposited metal subsisting on said optical modulation electrode affects the propagation of electromagnetic radiation by the device.

19. A reversible electrodeposition device for controlling the propagation of electromagnetic radiation, comprising:
   an optical modulation electrode which is substantially transparent to the radiation;
   a counter electrode comprised of a plurality of electrically isolated segments of an oxide conductor disposed on an electrically insulating substrate comprised of a material selected from the group consisting of glasses, ceramics, plastics, resins, and composites; and
   an electrolyte containing ions of an electrodepositable metal, in electrical contact with said optical modulation electrode and said counter electrode,
   such that a positive electrical potential applied to one of said segments relative to said optical modulation electrode tends to cause the electrodepositable metal to be electrodeposited from said electrolyte onto a localized area of said optical modulation electrode, and
   such that a negative electrical potential applied to one of said segments relative to said optical modulation electrode tends to cause the electrodepositable metal to be dissolved into said electrolyte from a localized area of said optical modulation electrode,
   wherein the amount of electrodeposited metal subsisting on said optical modulation electrode affects the propagation of electromagnetic radiation by the device.

* * * * *